Dec. 11, 1962   D. R. GREGORY ETAL   3,067,537
LINE KEEPER FOR FISHING RODS
Filed April 6, 1961
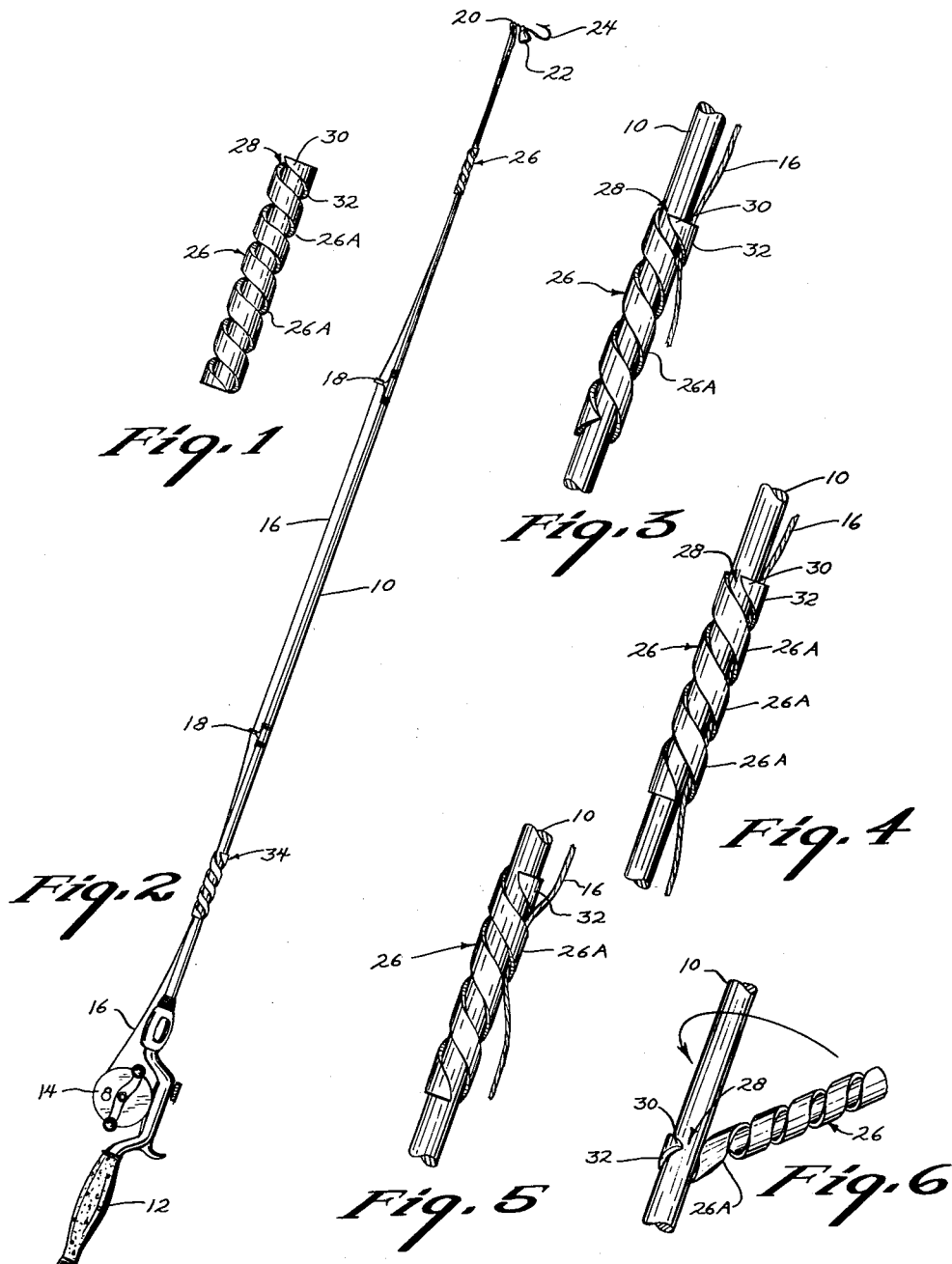
INVENTORS
DONALD R. GREGORY
FRANCIS D. GREGORY
BY Talbert Dick & Zarley
ATTORNEYS
WITNESS
NORMAN G. TRAVISS 3,067,537
Patented Dec. 11, 1962

3,067,537
LINE KEEPER FOR FISHING RODS
Donald R. Gregory and Francis D. Gregory, both of
Webster City, Iowa
Filed Apr. 6, 1961, Ser. No. 101,100
4 Claims. (Cl. 43—25.2)

Our invention relates to fishing equipment and more particularly to a line keeper to stabilize the line on a fishing rod.

When a reel-type fishing rod is being carried or stored, the fisherman usually reels the line in until the hook and sinker elements are adjacent the outermost tip of the rod. However, despite locking devices on the reels and extreme care by the fisherman, the line which is threaded through eyelets on the rod still tends to become fouled and often the reel plays out additional line so that the hook and sinker elements depart from their retracted position adjacent the outer end of the rod. The line and hook then often become entangled with adjacent objects to the consternation and inconvenience of the fisherman.

Therefore, the principal object of our invention is to provide a device for use on fishing rods which can secure and stabilize the line to hold the line in any predetermined position desired by the fisherman.

A further object of our invention is to provide a line keeper for fishing rods which can be easily adapted to any rod, regardless of the rod's diameter.

A still further object of our invention is to provide a line keeper for fishing rods that can be easily placed on or removed from a fishing rod.

A still further object of our invention is to provide a line keeper for fishing rods that will not interfere with the movement of the line when the fisherman wishes to have the line in a movable condition.

A still further object of our invention is to provide a line keeper for fishing rods that is economical of manufacture, durable in use and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

FIG. 1 is a perspective view of our line keeper as it appears before being mounted on a fishing rod;

FIG. 2 is a perspective view of two of our line keepers mounted on a fishing rod;

FIG. 3 is a partial perspective view showing one manner in which a line can be stabilized by our device when mounted on a fishing rod;

FIG. 4 is a partial perspective view showing a second manner in which a line can be stabilized by our device when mounted on a fishing rod;

FIG. 5 is a partial perspective view showing a third manner in which a line can be stabilized by our device when mounted on a fishing rod; and FIG. 6 is a partial perspective view of our device showing it being mounted on a fishing rod.

We have used the numeral 10 to designate a conventional fishing rod with handle 12 and reel 14. A fishing line 16 extends along the length of rod 10 from the reel 14 and is threaded through eyelets 18 which are secured to the rod 10 in spaced apart relation. A conventional eyelet 20 is secured to the outer end of rod 10 and line 16 is adapted to pass therethrough in conventional fashion. A sinker element 22 and hook 24 can be secured to the outer end of line 16 beyond the outer end of rod 10 as shown in FIG. 2.

Our line keeper 26 is comprised of an elongated strip of flexible, resilient material of plastic or the like that is formed into a spirally shaped configuration with each spiral normally being in spaced apart relation. The keeper 26 is formed to normally yieldably assume the shape shown in FIG. 1 and is adapted to have its diameter yieldably increased as it is placed upon a rod which has a greater diameter than the inside diameter of the keeper 26.

Keeper 26 can be placed on rod 10 by forcing a point on the length of the rod into the space 28 adjacent the end of flexible end portion 30. This causes some temporary distortion of spiral 32 as shown in FIG. 6, but it will allow the first spiral 32 to embrace the diameter of the rod. Then, upon holding the spiral 32 against movement with the rod, the keeper 26 is wound or twisted around the rod as shown by the arrow in FIG. 6, and the continued movement of the keeper around the rod in this manner will allow the keeper to embrace the rod throughout the length of the keeper. If the diameter of the rod 10 is greater than the inside diameter of the keeper 26, the spirals 26A of the keeper will tighten as their diameters increase to firmly grip the rod. Normally, keeper 26 is mounted near the end of the rod 10 and if desired, an identical keeper 34 can be mounted on the rod at a point closer to handle 12.

When at least one of our keepers 26 or 34 is mounted on rod 10 in the manner described, and the fisherman has withdrawn line 16 to the position shown in FIG. 1 before storing or traveling wtih his rod, the portion of line 16 adjacent keeper 26 can be "hooked" over the flexible end portion 30 of the keeper to hold the line firmly between the spiral 32 and rod 10. The pressure exerted on the line by spiral 32 will normally prevent the line from freely playing out from the reel 14. This arrangement of keeper 26 with line 16 is shown in FIG. 3.

If the keeper in FIG. 3 is rotated from right to left (as viewed in FIG. 3) about rod 10, the continued rotation thereof will allow the keeper to completely envelop the line 16 as shown in FIG. 4. FIG. 5 shows an intermediate position in between the conditions of FIG. 3 and FIG. 4 where the line is only partially secured by the keeper 26 and where line 16 has been freed of spiral 32. Continued rotation of the keeper 26 in FIG. 5 will eventually free line 16. The line 16 can be freed from the conditions shown in FIGS. 3 and 4 by merely reversing the described functions. The spaces between the spirals (such as space 28) tend to close as the keeper is placed on a rod having a substantially greater outside diameter than the inside diameter of the keeper. Thus, these spaces in the relaxed keeper of FIG. 1 are important to permit the keeper to receive a large diameter rod without completely binding one spiral against another.

Thus, from the foregoing, it is seen that our device will accomplish at least all of its stated objectives.

Some changes may be made in the construction and arrangement of our line keeper for fishing rods without departing from the real spirit and purpose of our invention, and it is our intention to cover by our claims, any modified forms of structure or use of mechanical equivalents which may be reasonably included wtihin their scope.

We claim:

1. In combination, an elongated fishing rod being substantially circular in cross section, a single elongated fish line, means on said fishing rod to movably maintain said fish line along the length of said fishing rod, a fish line keeper element on said rod, said keeper element comprised of an elongated strip of resilient, yieldable material, said elongated strip being substantially rectangular in cross section and presenting straight and smooth exterior surfaces, said elongated strip being wound into a continuous tube-like shape consisting of a plurality of spiral portions having inner and outer diameters, the spiral portions of said keeper element extending around said rod, said spiral portions normally having an inner diameter less than the outer diameter of said rod when not extending around said rod, and a portion of said fish line adjacent said keeper element being in a condition of frictional engagement between said rod and at least one of the spiral portions of said keeper element, said keeper element being of continuous and uniform construction and cross section throughout its length.

2. In combination, an elongated fishing rod being substantially circular in cross section, a single elongated fish line, means on said fishing rod to movably maintain said fish line along the length of said fishing rod, a fish line keeper element on said rod, said keeper element comprised of an elongated strip of resilient, yieldable material, said elongated strip being substantially rectangular in cross section and presenting straight and smooth exterior surfaces, said elongated strip being wound into a continuous tube-like shape consisting of a plurality of spiral portions having inner and outer diameters, the spiral portions of said keeper element extending around said rod, each of said spiral portions having lateral edges in spaced relationship to the lateral edges of the other spiral portions, said spiral portions normally having an inner diameter less than the outer diameter of said rod when not extending around said rod, and a portion of said fish line adjacent said keeper element being in a condition of frictional engagement between said rod and at least one of the spiral portions of said keeper element; said keeper element being of continuous and uniform construction and cross section throughout its length.

3. In a keeper element for fish lines, an elongated strip of resilient yieldable material; said elongated strip being substantially rectangular in cross section and presenting straight and smooth exterior surfaces, said elongated strip being wound into a continuous elongated tube-like shape consisting of a plurality of spiral portions, said keeper element being adapted to receive a portion of the length of an elongated fishing rod within said spiral portions; said keeper element being of continuous and uniform construction and cross section throughout its length.

4. In a keeper element for fish lines, an elongated strip of resilient yieldable material, said elongated strip being substantially rectangular in cross section and presenting straight and smooth exterior surfaces, said elongated strip being wound into a continuous elongated tube-like shape consisting of a plurality of spiral portions, said keeper element being adapted to receive a portion of the length of an elongated fishing rod within said spiral portions; each of said spiral portions having lateral edges in spaced relationship to the lateral edges of the other spiral portions; said keeper element being of continuous and uniform construction and cross section throughout its length.

References Cited in the file of this patent

UNITED STATES PATENTS

| 1,964,631 | Hansen | June 26, 1934 |
| 2,749,644 | Taggart | June 12, 1956 |

FOREIGN PATENTS

| 800,088 | France | Apr. 20, 1936 |